United States Patent
Wolf et al.

[11] 3,722,220
[45] Mar. 27, 1973

[54] REACTION PROPULSION ENGINE AND METHOD OF OPERATION

[75] Inventors: Robert L. Wolf, Chesterfield County, Va.; Rodney McGann, Northridge, Calif.

[73] Assignee: Texaco Inc., New York, N.Y.

[22] Filed: Nov. 20, 1963

[21] Appl. No.: 325,118

[52] U.S. Cl. ................................................60/267
[51] Int. Cl. ............................................F02k 11/00
[58] Field of Search.60/35.3, 35.6U, 35.6W, 35.6LL 60/35.6 P, 35.6 RJ, 35.6 RT, 267

[56] References Cited

UNITED STATES PATENTS

| | | | |
|---|---|---|---|
| 2,620,625 | 12/1952 | Phaneuf | 60/35.6 P |
| 2,030,771 | 4/1962 | Hopper | 60/35.6 W |
| 3,164,955 | 1/1965 | Garraway | 60/35.3 |

Primary Examiner—Samuel Feinberg
Attorney—Stowell & Stowell

EXEMPLARY CLAIM

1. A reaction propulsion system including means providing a combustion chamber having an impulse expansion outlet nozzle therefrom, means providing a ram air intake, means directing air from the ram air intake to the combustion chamber, a fuel storage chamber, heat exchange means in heat exchange contact with the air in said air directing means, means directing fuel from said storage chamber through said heat exchange means, an air compressor providing a portion of the air directing means between the heat exchange means and said combustion chamber, a direct expansion turbine for driving said compressor, means directing at least a portion of fuel from said heat exchange means through the direct expansion turbine and then into said combustion chamber, a regenerative heat exchanger in said combustion chamber, and means for selectively directing a portion of the fuel passing through said heat exchanger to said regenerative heat exchanger and then to the turbine.

2 Claims, 1 Drawing Figure

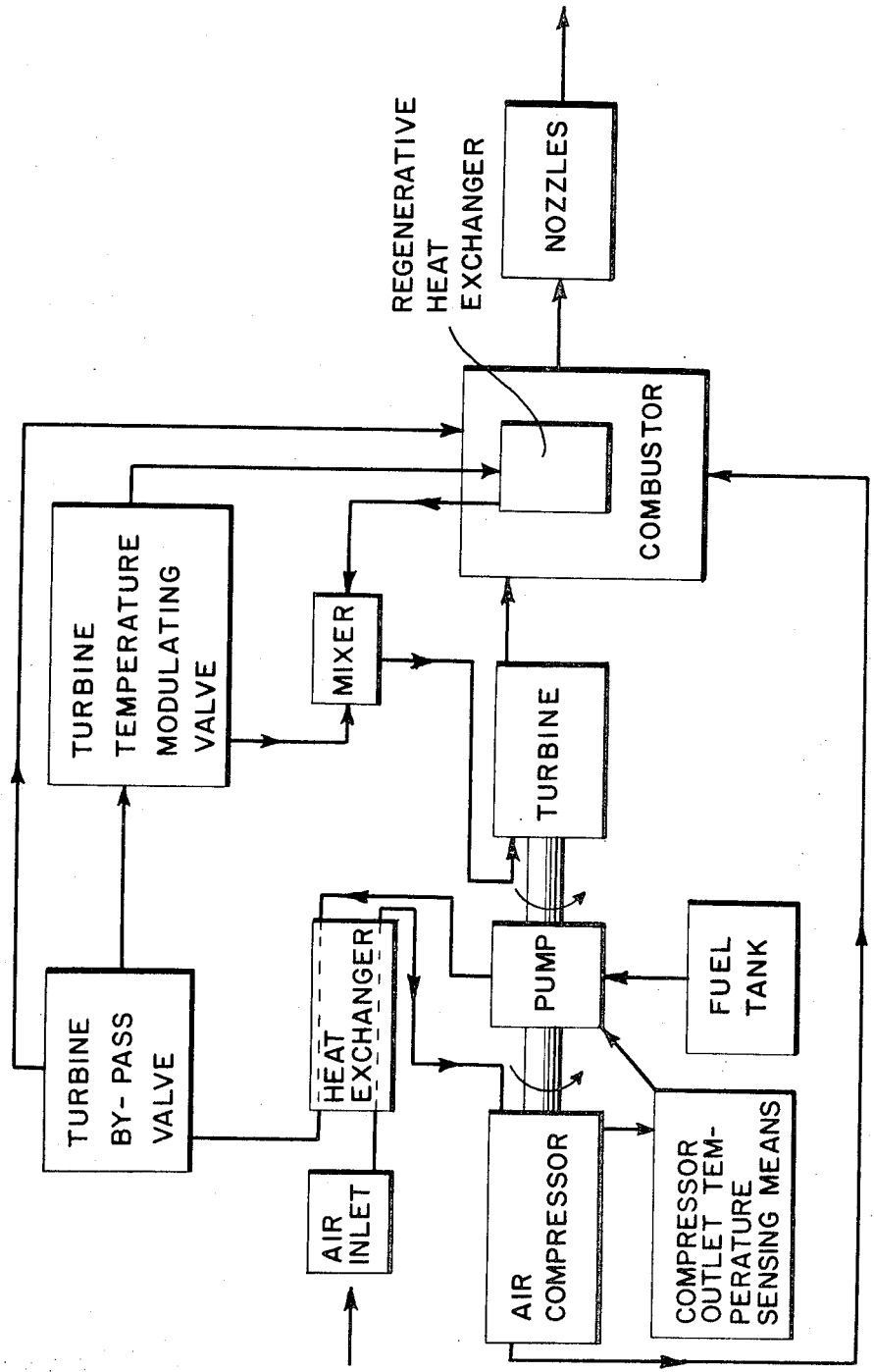

REACTION PROPULSION ENGINE AND METHOD OF OPERATION

This invention relates to reaction propulsion engines and to methods of operating them and particularly to relatively small and lightweight air breathing reaction propulsion engines which will be able to accelerate efficiently a load from standstill to hypersonic speeds.

It is a principal object of the present invention to provide an air breathing reaction engine wherein a portion of the energy of the ram air is transferred to the fuel by heat exchange between the ram air and the fuel and thereafter the energy thus transferred is utilized, at least in part, by expanding the fuel or a portion thereof in a turbine driving an air compressor for the engine.

By locating a heat exchanger in the air inlet, the heat exchanger cools the ingested diffused air so that the engine downstream of the heat exchanger will not be subjected to temperatures exceeding, for example, that corresponding to about Mach 3 (about 650° F) during Mach 8 flight conditions.

A further object is to provide such an engine wherein the air stream is more easily compressed by cooling the ingested air prior to compression.

Another object of the present invention is to provide an engine having a regenerative heat exchanger in the combustion chamber of the engine whereby from launching velocities to the low hypersonic range of about Mach 4 the regenerative heat exchanger is employed to provide a portion of the energy required to operate the air compressor.

Another object of the invention is to provide an engine wherein the turbine is not aerodynamically coupled to the compressor whereby the power supply to the turbine does not depend on air flow through the compressor, eliminating the need for variable geometry compressors or air bleeding while operating over a very wide range of flight conditions.

Another object of the present invention is to provide an air turbo engine wherein the air bypasses the turbine and the full compressor discharge pressure is discharged into the combustion chamber of the engine.

For high cooling efficiency, it is desirable that the fuel selected have a high heat capacity within the operating temperature range to provide for a high absorption of energy per pound of fuel. For efficient conversion of energy to thrust in the expansion process, the fuel should be one which provides a low average molecular weight in the exhaust gases. Within these limitations a considerable range of fuels is available from which selection may be made in the light of other properties of the fuels and the effect on the particular demands to be made on the engine. Among the fuels of interest are hydrogen and hydrogen-bearing compounds such as ammonia, methyl alcohol, ethyl alcohol, methane, ethylene glycol and cyclohexane.

Of these fuels, fuels which undergo endothermic decomposition or dissociation at temperatures between their storage temperature and the turbine and/or combustor entrance temperature are particularly suited for use in the engine. The most suitable fuels will dissociate at these temperatures to hydrogen and other relatively low molecular weight compounds without the formation of free carbon particles. Preferred examples of such fuels are ammonia, methyl alcohol, ethylene glycol and cyclohexane.

The preferred high heat capacity fuels, ammonia, methyl alcohol, ethylene glycol and cyclohexane, dissociate into hydrogen and nitrogen, hydrogen and carbon monoxide, hydrogen and carbon monoxide, and hydrogen and benzene, respectively. The dissociation is endothermic and the resulting gaseous products are of low molecular weight and are exceptionally clean; that is, they and their combustion products have little or no tendency to foul the engine as they contain no free carbon.

In general, the invention comprises the method of operating an air breathing propulsion system comprising transferring a portion of the energy from the ram air of the system to the fuel supply by indirect heat exchange between the ram air and the fuel; selectively directing a portion of the heat fuel through the turbine of a turbo-compressor; passing the cooled ram air through the compressor of the turbo-compressor; directing the fuel from the turbine, at least a part of the other portion of the fuel and the compressed air from the turbo-compressor into a combustion chamber; selectively transferring a portion of the energy from the combustion chamber of the system to a portion of the ram air heated fuel for the turbine of the turbo-compressor by indirect heat exchange between the combustion products and said portion of the fuel; and expanding the combustion products through an impulse expansion nozzle.

The invention will be more particularly described with reference to the drawing wherein a schematic representation of a system of the invention is illustrated.

Referring to the drawing, fuel is pumped, by the turbine driven pump, from the fuel tank through the heat exchanger. Ram air, following a conventional diffuser, is passed in indirect heat exchange relationship with the fuel in the heat exchanger, whereby the temperature of the fuel is raised and the temperature of the inlet air is cooled.

The rate of flow of fuel to the ram air heat exchanger may be controlled within wide limits by varying the output from the fuel pump or by providing a control valve in the outlet line from the fuel pump to the heat exhanger. The pump output volume or the control valve may be manually controlled and/or as indicated in the drawing, the control of the pump output or control for the output control valve may be provided by the compressor outlet temperature sensing means which would insure that sufficient fuel is passed to the heat exchanger to maintain limits on the turbine inlet temperature and the compressor discharge temperature.

The heated fuel is then passed to the turbine bypass valve and a portion of the fuel not required to drive the turbine may be directed into the combustor as indicated in the drawing. It will also be appreciated that the fuel passing directly from the turbine bypass valve to the combustor may be expanded through a thrust nozzle positioned within the combustor or all or a portion of this fuel may be expanded through a thrust nozzle external of the combustor. The use of such a thrust nozzle has particular utility where the amount of fuel needed to cool the ram air is greater than the amount which could be burned stoichiometrically with the available air supply. The cooled air issuing from the heat exchanger is passed through the air compressor and the compressed air is then directed to the combustor.

The portion of the fuel heated in the air inlet heat exchanger which is required to drive the turbine is passed through a turbine bypass valve to a turbine temperature modulating valve. The turbine temperature modulating valve, after sensing the temperature of the fuel passed thereto, distributes a portion thereof to the regenerative heat exchanger, located in the combustor, and a portion to the mixer. In the regenerative heat exchanger, the fuel directed thereto is further heated by combustion of the fuel from the turbine bypass valve and by combustion of the fuel from the turbine with the compressed air from the air compressor. The heated fuel from the regenerative heat exchanger also passes to the mixer where it is mixed with the cooler heated fuel from the turbine modulating valve and the resulting mixture is directed to the turbine where it is expanded and a portion of its energy removed in driving the fuel pump and the air compressor. The exhaust from the turbine is directed to the combustor where it, in turn, is burned in the compressed air as indicated above.

The products of combustion of the fuel, directed to the combustor from the turbine bypass valve and exhausting from the turbine, issue through the outlet nozzle of the engine to produce thrust. It is a function of the turbine temperature modulating valve to pass sufficient fuel to the regenerative heat exchanger to insure that the fuel mixture finally expanded through the turbine has a high enough energy level to satisfy the requirements of the turbine in operating the fuel pump and the compressor. Controllers for fuel flow through the turbine bypass valve and for the turbine temperature modulating valve may be fuel, turbine or compressor temperature responsive, altitude responsive, vehicle speed responsive, or turbine speed responsive or a combination of two or more of these factors.

As the Mach number of the vehicle increases, less and less of the fuel directed from the turbine bypass valve to the turbine modulating valve is passed to the regenerative heat exchanger as a greater amount of energy is imparted to the fuel from the ram air. Generally, above Mach 3 the temperature of the ram air is such that the entire energy requirements of the turbine are provided by the air inlet heat exchanger and none of the fuel is required to be passed through the regenerative heat exchanger in the combustor. However, some fuel may be passed to the regenerative heat exchanger at all times to prevent over heating of the structure.

As hereinbefore discussed, for high cooling efficiency and to provide a high absorption of energy per pound of fuel, it is desirable that the fuel selected have a high heat capacity within the expected operating temperature range of the engine. At the same time, for efficient conversion of energy into thrust in the expansion process, the fuel should be one which provides low average molecular weight components in the exhaust gases. Thus, cryogenic hydrogen or fuels which undergo endothermic decomposition at temperatures between their storage temperature and the turbine and/or combustor entrance temperatures are particularly suited for use in the system of the invention.

When such fuels are used at relatively low flight speeds of about below Mach 1.5 in a system where the incoming air and a regenerative heat exchanger are used to heat the fuel prior to combustion, there will be very little heating of the fuel by the incoming air. Most of the heat required to decompose and/or evaporate the fuel and heat the fuel to the turbine inlet temperature required to operate the air compressor will come from the regenerative heat exchanger. As the flight speed and the temperature of the inlet air increase, there will be more cooling of the air ahead of the compressor and hence more heating of the fuel prior to its passage to the turbine and/or combustion zone. Thus, less heat will be required from the combustion zone via the regenerative heat exchanger and less fuel will be programmed through the regenerative heat exchanger located in the combustion area prior to its expansion across the turbine. At still higher flight speeds, all of the required heat will come from the cooling of the inlet air and no heat will be taken from the combustion zone via the regenerative heat exchanger.

The air to fuel indirect heat exchanger located ahead of the air compressor serves three main purposes. The first is to increase the available turbine work of the fuel by heat addition without combustion while lowering the work required to compress the air thereby making the cycle more efficient. The second is to cool the incoming air to acceptable temperature levels, preferably below 1200° F., to avoid excessive exit temperatures and dissociation of the products in the combustion zone. The third is to increase the density of the air through cooling to give a higher mass flow per unit of compressor frontal area and a resultant higher level of thrust.

At higher flight Mach numbers, it becomes increasingly important to cool the incoming air, down to acceptable levels for the compressor. It then becomes necessary to run the heat exchanger richer than at lower Mach numbers, i.e., using an amount of fuel in excess of that which can be expanded across the turbine without overspeeding the rotating assembly. The excess fuel is passed directly to the combustor for combustion along with the fuel that has been expanded across the turbine. A portion of the fuel used in cooling the inlet air may be burned stoichiometrically with the air in the combustor while the remainder may be expanded directly to the atmosphere through a separate thrust nozzle as described hereinbefore. The proportion separately expanded is determined by the maximum exhaust gas temperature and the maximum degree of dissociation to be maintained. The use of endothermically dissociating fuels according to the process of the invention minimizes the expenditure of uncombusted fuel.

EXAMPLE I

An engine of the type illustrated in the drawing can be operated efficiently through the velocity range from static launch to Mach 10 and at altitudes up to 150,000 feet using the endothermically dissociating fuels of the invention or cryogenic hydrogen. Below about Mach 4 heat is added to the fuel in the regenerative heat exchanger to provide enough energy to drive the turbine without the use of auxiliary fuel combustion ahead of the turbine. Above about Mach 4 none of the fuel is passed to the regenerative heat exchanger as inlet air heating of the fuel provides all of the energy requirement of the turbine.

Related subject matter is disclosed in co-pending application Ser. No. 152,097, Robert L. Wolf et al., filed Nov. 13, 1961.

Where desired, the cold fuel exhausting from the turbine may be utilized to cool engine parts such as the combustor case, exhaust nozzle, etc. prior to combustion of the fuel with the compressed air in the combustor.

We claim:

1. A reaction propulsion system including means providing a combustion chamber having an impulse expansion outlet nozzle therefrom, means providing a ram air intake, means directing air from the ram air intake to the combustion chamber, a fuel storage chamber, heat exchange means in heat exchange contact with the air in said air directing means, means directing fuel from said storage chamber through said heat exchange means, an air compressor providing a portion of the air directing means between the heat exchange means and said combustion chamber, a direct expansion turbine for driving said compressor, means directing at least a portion of fuel from said heat exchange means through the direct expansion turbine and then into said combustion chamber, a regenerative heat exchanger in said combustion chamber, and means for selectively directing a portion of the fuel passing through said heat exchanger to said regenerative heat exchanger and then to the turbine.

2. The invention defined in claim 1 wherein control for said means for selectively directing a portion of the fuel from said heat exchanger through the regenerative heat exchanger is provided by the temperature of the fuel passing from said heat exchanger.

* * * * *